Figure 1:
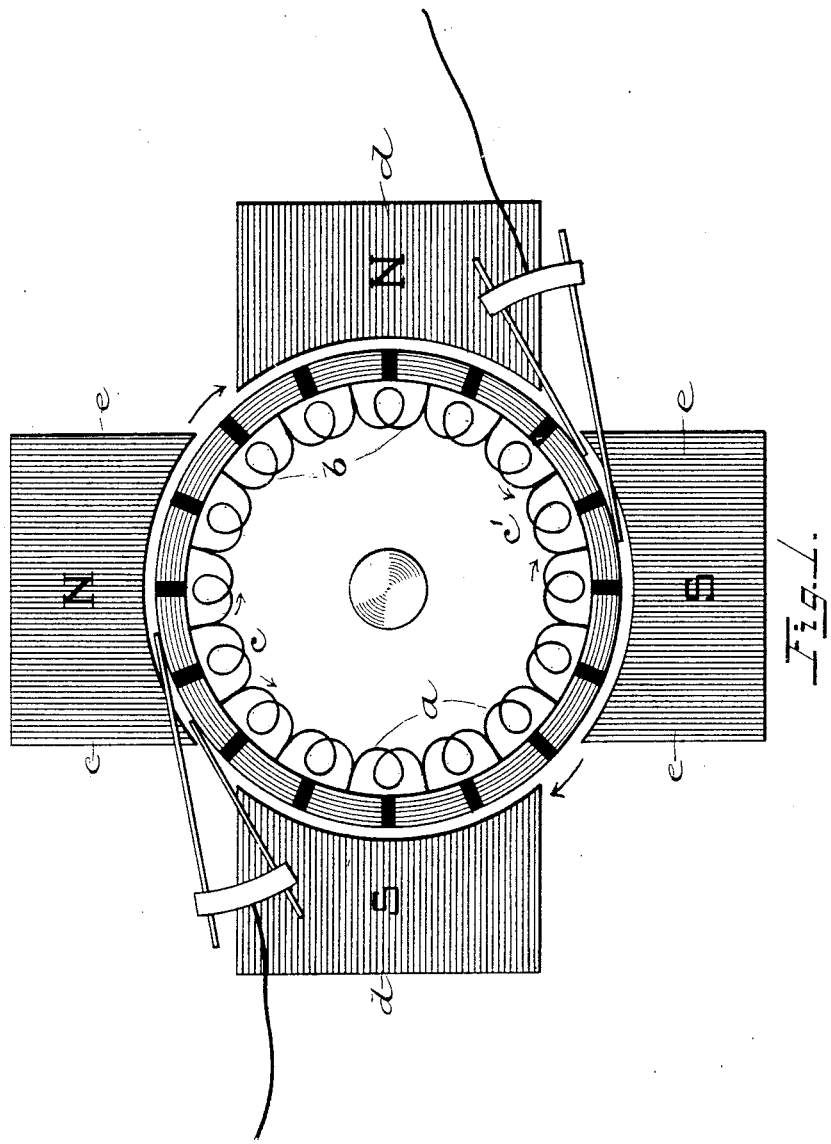

(No Model.) 3 Sheets—Sheet 1.

C. E. SCRIBNER.
SPARK REGULATOR FOR DYNAMO ELECTRIC MACHINES.

No. 512,397. Patented Jan. 9, 1894.

Witnesses.
C. G. Hawley.
Geo. R. Parker.

Inventor.
Charles E. Scribner
By George P. Barton
Attorney.

(No Model.) 3 Sheets—Sheet 3.

C. E. SCRIBNER.
SPARK REGULATOR FOR DYNAMO ELECTRIC MACHINES.

No. 512,397. Patented Jan. 9, 1894.

Witnesses.
O. G. Hawley.
Geo. R. Parker.

Inventor.
Charles E. Scribner.
By George H. Barton
Attorney

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

SPARK-REGULATOR FOR DYNAMO-ELECTRIC MACHINES.

SPECIFICATION forming part of Letters Patent No. 512,397, dated January 9, 1894.

Application filed June 1, 1889. Serial No. 312,921. (No model.)

*To all whom it may concern:*

Be it known that I, CHARLES E. SCRIBNER, a citizen of the United States, residing at Chicago, in the county of Cook and State of Illinois, have invented a certain new and useful Improvement in Spark-Regulation for Dynamo-Electric Machines, (Case No. 196,) of which the following is a full, clear, concise, and exact description, reference being had to the accompanying drawings, forming a part of this specification.

My invention relates to dynamo electric machines in which the different coils or different portions of the armature are short circuited one after another. During the time of this short circuiting the current changes from one polarity to the other. Each coil is short circuited at particular positions with reference to the brushes and field twice during each revolution of the armature. And thus taking an instantaneous observation of the machine there will always be certain coils, that is those under the brushes, which will be at the instant short circuited, and it has become common in the art to designate the coils at the moment they pass under the brush and when they are thus practically taken out of the circuit, that is, momentarily shunted, as "short circuited coils." It is while thus short circuited that the current changes from one direction to the other. Suppose the time of short circuiting to be a three hundred and sixty-second part of a second the current in the coil during this time goes to zero and then builds up in the opposite direction to a certain extent; the amount that it builds up depends upon the force of the field in which it is moving. The current which is built up is in the direction of the current in the circuit containing the brush or brushes and I have discovered that in order to prevent sparking or arcing at the brushes the current should build up to be of the same strength as that in the circuit into which the coil is moving. I have also discovered that the field of force of the short circuited coil must have a particular strength so as to cause the current which is built up in the short circuited coil to be equal to the current in the circuit into which the short circuited coil is introduced when the short circuit is removed. Assume the machine to be giving forth say a twenty ampère current; the current then of the generating coils on the opposite sides of the armature would be ten each; the field then of the coils as they are short circuited one after another must be of sufficient strength to cause a current of ten ampères to be built up in each coil at the time each coil is introduced into the circuit after being short circuited.

My invention therefore, speaking generally, consists in maintaining under given conditions a practically constant field for the short circuited coils, the strength of said field being such that the current built up will be equal to the current in the circuit into which the short circuited coil is introduced at the moment the short circuit is removed. In this manner arcing or sparking at the brushes is practically prevented.

In carrying out my invention I provide preferably two sets of field magnets, the poles of which are arranged about the revolving armature on different sides thereof; two of these poles are designed to remain practically constant as long as the current taken off from the machine is constant. The other poles are designed especially for affording a field of force for the coils which are generating and giving off the current, and consequently the force of this field should vary as the resistance of the circuit varies so as to maintain constant current strength as is necessary in arc lighting. Speaking generally, then, it may be said that we have a constant field of force for the short circuited coils and a variable field of force for the other coils, that is, the coils which are generating and giving off the current.

My invention may be said to consist in maintaining the field of force of the short circuited coils practically constant while the field of force of the other coils which I may term the current producing coils is caused to vary automatically to change the electro motive force of the machine responsively to variations in the resistance of the circuit to maintain a practically uniform current strength.

My invention also comprises the method of changing the strength of the field of force of the short circuited coils when the current of the main circuit is changed so that the current built up in the short circuited coils may as before stated have the proper strength and direction when the short circuit is removed and the coil which was short circuited comes into the position of an active or working coil.

It is evident that my invention may be embodied in various forms of mechanism. I have, however, for clearness of illustration shown herein only one form of apparatus adapted to operate in accordance with my method.

Figure 2:
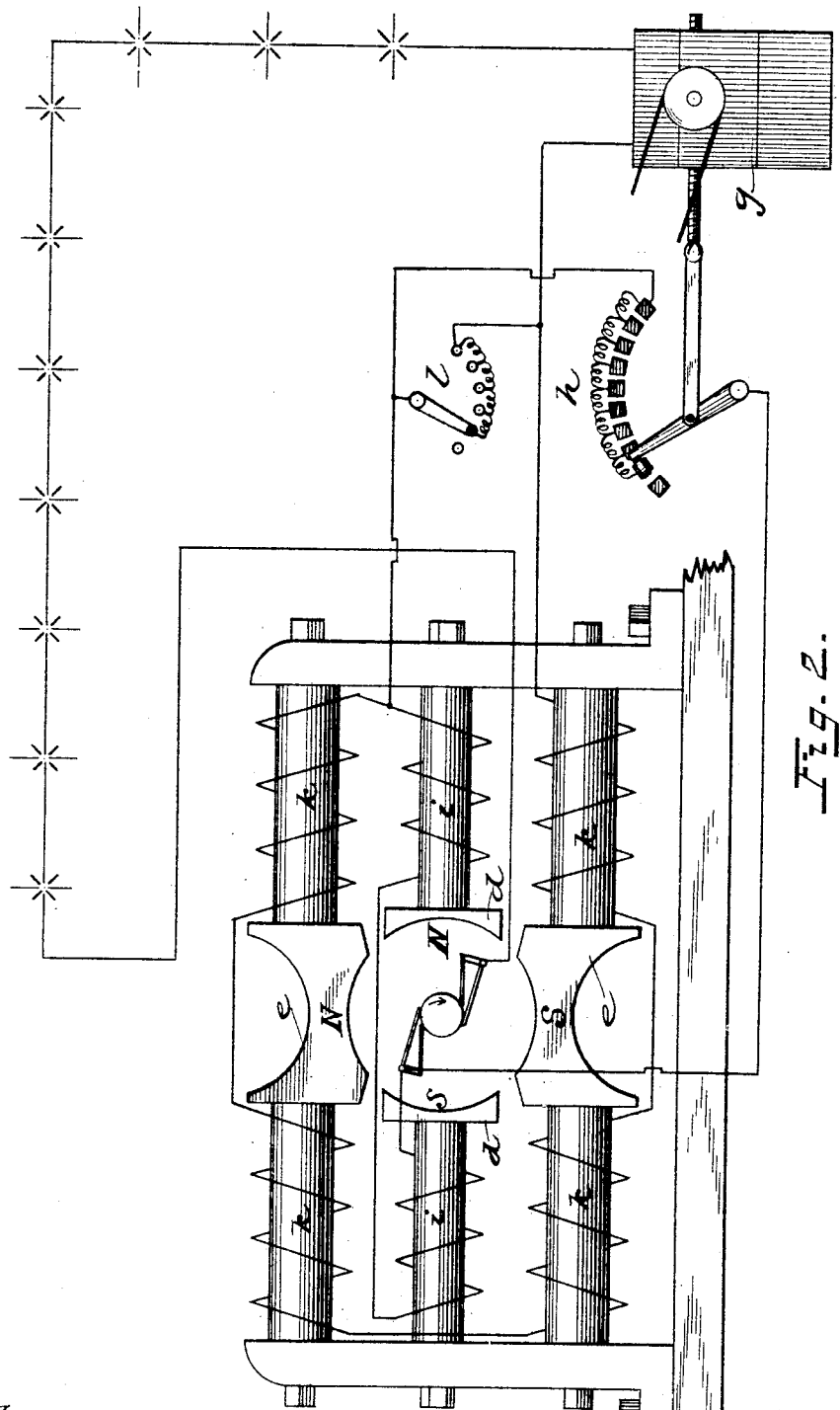
Figure 3:
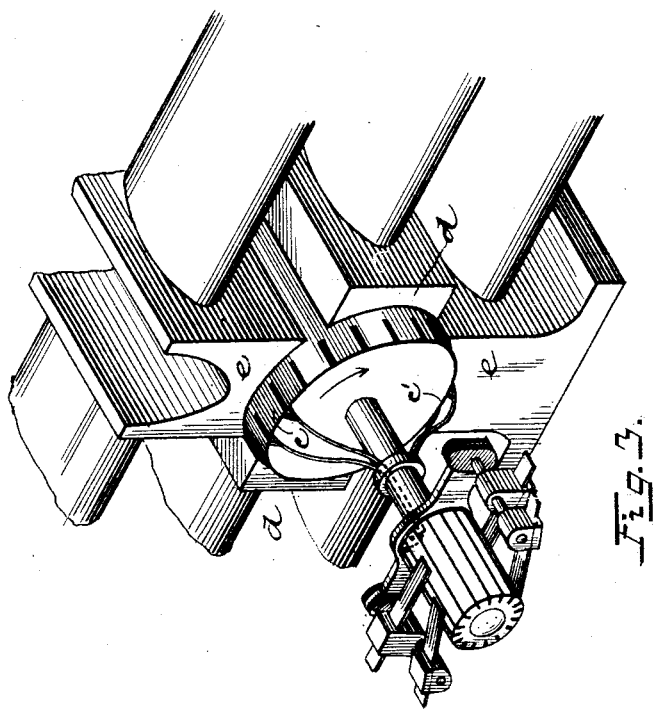

In the drawings which are illustrative of my invention—Figure 1 is a diagram illustrative of my theory of the operation of a dynamo electric machine embodying my invention. Fig. 2 is a diagram of the circuits of a dynamo electric machine embodying my invention. Fig. 3 is an isometric view showing the commutator and brushes and the end of the armature with the poles in proper relation thereto somewhat in detail.

Like parts are indicated by similar letters of reference throughout the different figures.

Referring now to Fig. 1 we will assume that the machine has an electro motive force of one thousand volts and that the resistance of the circuit is fifty ohms and thus the current would be twenty ampères. The current in the working coils $a$ would therefore be ten ampères and in the working coils $b$ ten ampères. We will consider $c\ c'$ as the short circuited coils or short circuited portions of the armature. Assume the coils revolving in the direction indicated by the outside arrow and the current to be in the direction indicated by the inside arrows, the poles $d$ may be considered as causing the field of force of the working coils $a\ b$ and the poles $e$ may be considered as causing the constant field of force for the short circuited coils $c\ c'$. It will be understood that a particular coil is short circuited only for an instant and that the coils are necessarily in position to represent the portions of the armature which for clearness of description I have referred to as the short circuited coils. The coil $c$ when it ceases to be one of the coils $a$, that is, at the moment it is first short circuited, has a current of ten ampères, that being the current in the working coils $a$. While it is thus short circuited its current changes from one sign to the other and my discovery or invention is founded upon the fact that the current in the short circuited coil must be built up while it is short circuited so as to be in the same direction as the current in coils $b$ and of the same strength as the current in the coils $b$ in order that sparking may be prevented at the moment said coil $c$ is brought into the circuit of and becomes one of the coils $b$. The force of the field $e$ must be of a definite strength in order that the current may thus be built up; that is to say, the current in the coils $b$ being constant a given field of force $e$ will build the current up in coil $c$ to the amount desired, that is, to be equal to the current in coils $b$ at the moment said coil $c$ is brought into the circuit of and becomes one of the current producing coils $b$.

In case it is desired to definitely change the current of the machine, that is to say, suppose it were desired to convert the machine into a high tension machine giving a current of ten ampères. In this case the coils $a$ and $b$ would carry each a current of five ampères. Therefore the strength of the field of the short circuited coil should be only of sufficient force to cause the current in the short circuited coil to be built up to that amount, that is to say, to five ampères. Therefore in such case it is necessary to reduce the field of force caused by magnets $e$.

The field of force of the current producing coils $a\ b$ may be varied as before stated by an automatic regulator so as to maintain practically constant current strength.

Referring now to Fig. 2 the poles $d\ d$ and $e\ e$ correspond to the poles of the like letters in Fig. 1.

Referring to Fig. 3 the coil in the position indicated at $c$ will be one of the short circuited coils.

The regulator $g$ of Fig. 2 may be of any well known construction as, for example, of the form shown in my application, Serial No. 194,369, (Case No. 102,) filed March 6, 1886, for automatic regulators for dynamo electric machines. This regulator in response to changes in the current strength of the lamp circuit operates to bring more or less of the resistance of rheostat $h$ into the shunt circuit around the coils of the field magnets $i$. In this manner the current of the lamp circuit is maintained practically uniform notwithstanding changes in the resistance thereof caused by cutting in or out the lamps or other translating devices.

The electro magnets $k$ whose poles $e\ e$ are in position to form a field of force for the short circuited coils are included in the main circuit and the current in this main circuit remaining constant it is evident the field of force caused by the said poles will remain constant.

By an adjustment of the regulator $g$ the normal strength of the current in the lamp circuit may be changed as desired, for example, from twenty ampères to ten ampères. When such an adjustment is made a corresponding adjustment must be made in the strength of the field of force of the short circuited coils. Such an adjustment may be readily made by means of a hand switch as indicated at $l$. In this manner more or less of the current may be shunted off from the coils $k$. It thus appears that the current built up in the short circuited coils may be reduced to correspond to the changed conditions, that is to say, the reduction in the normal current strength.

I am aware that prior to my invention dynamos have been constructed in which more than two field magnet pole pieces were provided and in which the different pole pieces were adjustable in strength with relation to each other, but in none of these prior inventions was provision made for maintaining a practically constant field of force to be cut by the short circuited coils of the armature while the other portions of the field of force acting upon the current giving coils were variable.

In my Case No. 201, application Serial No. 312,925, filed June 1, 1889, I have claimed the apparatus illustrated herein. I therefore limit this patent to the method or methods particularly set forth in the claims, it being understood that several forms of apparatus may be used instead of the apparatus illustrated and described.

Having thus described my invention, I claim as new and desire to secure by Letters Patent—

1. The method of preventing sparking which consists in changing the strength of the field of force of the short circuited coils of a dynamo electric machine when the strength of the main current of the machine is changed to maintain a constant relation between the current which is built up in the short circuited coils and the current which is present in the current producing coils into the circuit with which the short circuited coils are introduced.

2. The method of preventing sparking which consists in maintaining under given conditions a practically constant field for the short circuited coils, the strength of said field being adjusted to build up a current in the short circuited coils which shall be practically equal to the current in the current producing coils into the circuit of which said short circuited coils are introduced in the rotation of the armature.

In witness whereof I hereunto subscribe my name this 2d day of May, A. D. 1889.

CHARLES E. SCRIBNER.

Witnesses:
GEORGE P. BARTON,
ELLA EDLER.